US005284321A

United States Patent [19]

Meyer

[11] Patent Number: 5,284,321

[45] Date of Patent: Feb. 8, 1994

[54] HYDRAULIC JACK WITH SINGLE CONTROL FOR ACTUATING HYDRAULIC VALVE MEANS

[75] Inventor: Barry G. Meyer, Fabius Township, St. Joseph County, Mich.

[73] Assignee: Meyer Hydraulics Corporation, Centreville, Mich.

[21] Appl. No.: 819,185

[22] Filed: Jan. 10, 1992

[51] Int. Cl.[5] .................... B60P 1/06

[52] U.S. Cl. .................... 254/2 B; 254/93 L; 254/93 H; 254/2 C; 60/478; 91/457

[58] Field of Search .................... 254/2 B, 2 C, 93 L, 254/93 H, DIG. 16; 60/478; 91/457

[56] References Cited

U.S. PATENT DOCUMENTS

| | | | |
|---|---|---|---|
| 2,165,095 | 7/1939 | Frechette | 254/2 B |
| 3,757,523 | 9/1973 | Resuggan | 254/93 H |
| 4,703,916 | 11/1987 | Hung | 254/93 H |

OTHER PUBLICATIONS

Owatonna Catalog; "Hydraulic Shop Forcing Presses", pp. 59-62; Owatonna Tool Company, Owatonna, Minn. Equipment and Supplies for Industry, Farm & Home, p. 1102.

*Primary Examiner*—Bruce M. Kisliuk

*Assistant Examiner*—Eileen P. Morgan

*Attorney, Agent, or Firm*—Flynn, Thiel, Boutell & Tanis

[57] ABSTRACT

A hydraulic jack movably supported by a plural casters has a vertically extending hydraulic cylinder with telescoping piston rods, has a load supporting frame at an upper end of the innermost piston rod, and has a reservoir partially filled with hydraulic fluid. A single foot pedal is pivotally supported on the jack, and is movable between first and second positions through a center position. A hydraulic valve arrangement is responsive to movement of the actuating member toward its first position for permitting fluid flow from the reservoir to the hydraulic cylinder and is responsive to movement of the actuating member toward its second position for permitting fluid flow from the hydraulic cylinder to the reservoir. A kicker lever supported for pivotal movement about the same axis as the actuating member is operatively coupled to the actuating member for movement therewith by two springs, and can actuate an air valve. In response to movement of the actuating member toward its first position, the kicker lever causes the air valve to supply pressurized air to the reservoir, and in response to movement of the actuating member toward its second position the kicker lever causes the air valve to vent pressurized air from the reservoir.

29 Claims, 5 Drawing Sheets

HYDRAULIC JACK WITH SINGLE CONTROL FOR ACTUATING HYDRAULIC VALVE MEANS

FIELD OF THE INVENTION

The present invention relates to a mobile hydraulic jack which can be used to remove and reinstall vehicle engines and transmissions from below a vehicle on a hoist and, more particularly, to such a hydraulic jack which uses pressurized air to effect pressurization of the hydraulic fluid when the jack is to be raised.

BACKGROUND OF THE INVENTION

Vehicle repair shops often find it necessary to remove the engine or transmission of a vehicle in order to effect necessary repairs. Obviously, the engine and transmission are too heavy for one or more repair men to manually remove from the vehicle, at least without an unnecessary risk of injury to themselves. Accordingly, mobile hydraulic jacks have been used for a number of years to facilitate removal and reinstallation of vehicle engines and transmissions. Typically, the vehicle is raised on a conventional hoist, and then the mobile hydraulic jack is moved beneath the raised vehicle, the hydraulic cylinder of the jack is extended to raise a load supporting frame into engagement with the engine or transmission, and then the engine or transmission can be detached from the vehicle and lowered out of the vehicle by the jack.

In conventional jacks of this type, extension of the piston of the hydraulic cylinder in order to raise the load supporting frame is normally effected by repeatedly operating a manual lever which drives a manual pump which in turn forces hydraulic fluid from a reservoir into the hydraulic cylinder. However, manually pumping the hydraulic fluid into the hydraulic cylinder is very tiring, and relatively time consuming.

One commercially available jack can use compressed air to effect a first stage of upward movement of the load supporting frame, but then the remainder of the upward movement of the load supporting frame must be effected in the traditional manner by repeatedly manually operating a lever coupled to a manual pump which forces hydraulic fluid into the hydraulic cylinder. In this known jack, the pneumatic and hydraulic capabilities are functionally separate, the hydraulic operation still being entirely manually controlled, with the traditional disadvantages.

An object of the present invention is therefore to provide a hydraulic jack which has no manually operated pump, and in particular in which the hydraulic operation is powered entirely by compressed air.

A further object is to provide such a jack in which all hydraulic and pneumatic valves are operated by a single foot pedal.

A further object is to provide such a jack in which the hydraulic valve arrangement will prevent downward movement of the load supporting frame when the operator has selected upward movement, so that a sudden and unexpected loss of pressurized air to the jack will not result in a sudden and unexpected downward movement of the load supporting frame or the associated risk of operator injury.

A further object is to provide such a jack which is durable and will provide a long and reliable operational lifetime with little or no maintenance

SUMMARY OF THE INVENTION

The objects and purposes of the invention, including those set forth above, are met according to a first form of the invention by a hydraulic jack which is movably supported on a plurality of casters and which includes a hydraulic cylinder having a vertically reciprocal piston rod, a load supporting frame at an upper end of the piston rod, an arrangement defining a reservoir partially filled with a hydraulic fluid, a manually actuable hydraulic valve arrangement for selectively controlling fluid flow from the reservoir to the hydraulic cylinder and for selectively controlling fluid flow from the hydraulic cylinder to the reservoir, and a manually actuated air valve arrangement for selectively supplying pressurized air to the reservoir and for selectively venting pressurized air from the reservoir.

A different form of the invention involves a hydraulic jack which includes a hydraulic cylinder having a piston rod reciprocable between extended and retracted positions, a load supporting member movable between two positions in response to movement of the piston rod, a manually operable actuating member movable between first and second positions, and a hydraulic valve arrangement responsive to movement of the actuating member toward its first position for permitting fluid flow from a source of pressurized hydraulic fluid to the hydraulic cylinder and responsive to movement of the actuating member toward its second position for permitting hydraulic fluid to flow out of the hydraulic cylinder.

Yet another form of the present invention involves a hydraulic jack which includes a hydraulic cylinder having a piston movable between extended and retracted positions, a load supporting member moved between two positions in response to movement of the piston rod, a reservoir partially filled with a hydraulic fluid, a manually actuable arrangement for generating manually actuated first and second conditions, a hydraulic valve arrangement responsive to the first condition for permitting fluid flow from the reservoir to the hydraulic cylinder and responsive to the second condition for permitting fluid flow from the hydraulic cylinder to the reservoir, and an air valve arrangement responsive to the first condition for supplying pressurized air to the reservoir and responsive to the second condition for venting pressurized air from the reservoir.

BRIEF DESCRIPTION OF THE DRAWINGS

A preferred embodiment of a hydraulic jack according to the invention will be described in detail hereinafter with reference to the accompanying drawings, in which.

DETAILED DESCRIPTION

Figure 1:
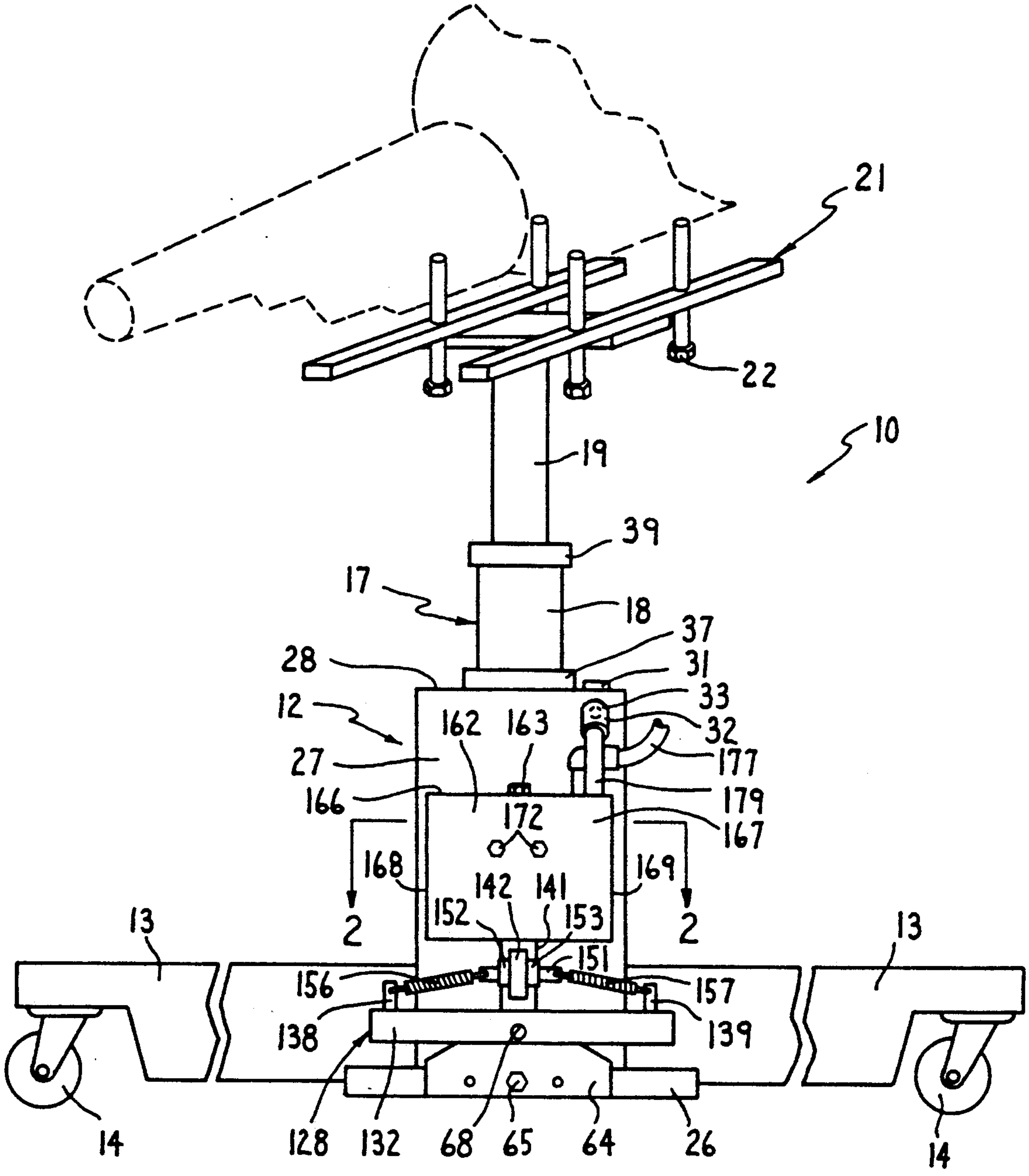
FIG. 1 is an elevational front view of a hydraulic jack embodying the present invention.

FIG. 1 depicts a pneumatically-operated hydraulic jack 10 which embodies the present invention. The hydraulic jack 10 includes a hydraulic control unit 12, four arms 13 fixedly secured to the hydraulic control unit 12 and projecting outwardly therefrom in respective directions (only two of the arms being visible in the drawings), a caster 14 secured to the outer end of each arm so that the entire jack is movably supported by the casters, a hydraulic cylinder 17 embedded in the hydraulic control unit 12 and having telescoping outer and inner piston rods 18 and 19, and a support frame 21 which is secured to the upper end of the inner piston rod 19, which can support a vehicle engine or transmission shown in broken lines, and which has pins or bolts 22 to help support the engine or transmission.

Figure 2:
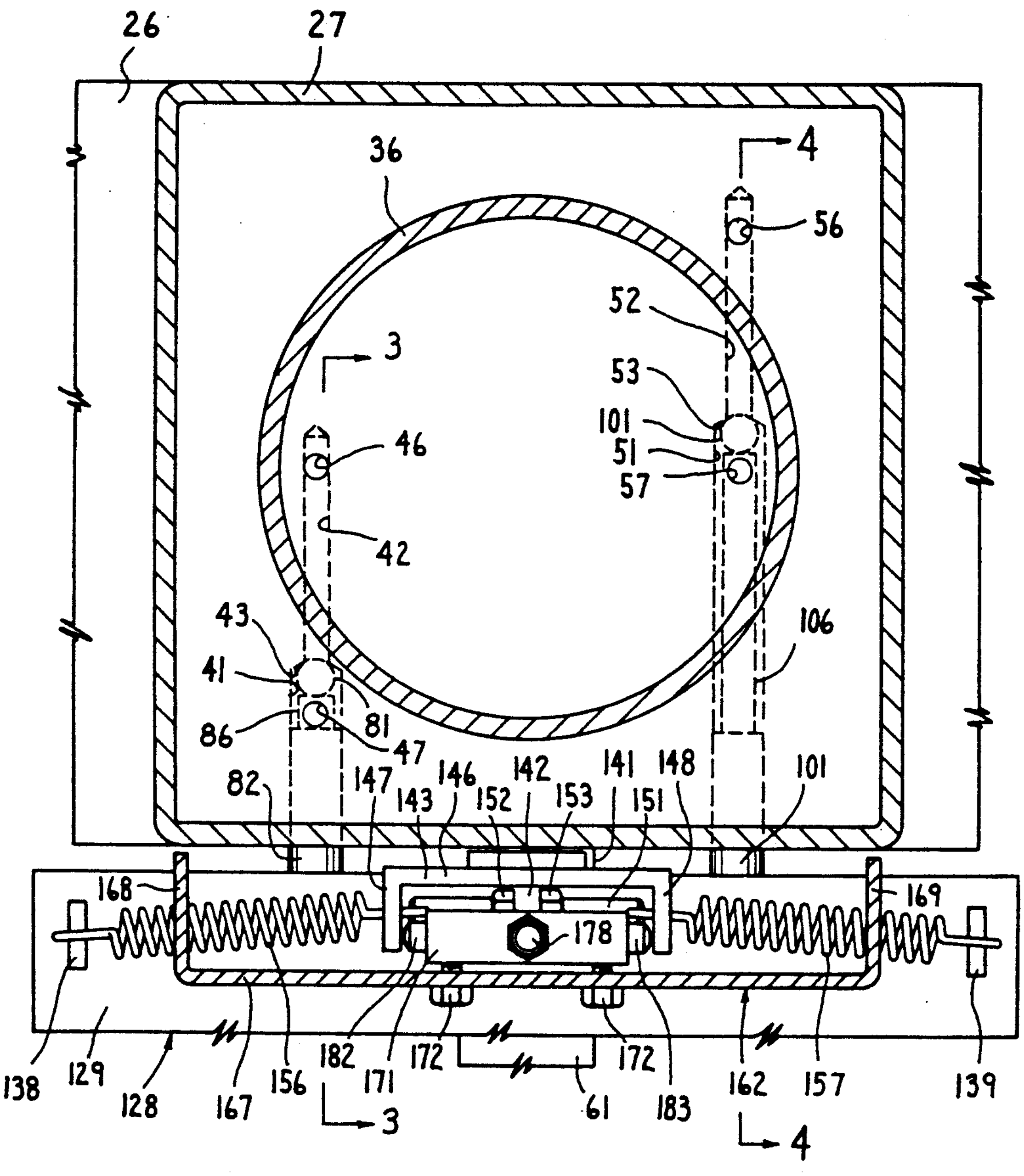
FIG. 2 is a sectional view taken along the line 2—2 in FIG. 1, but with some reservoir baffle plates omitted for clarity.

The hydraulic control unit 12 has at the lower end thereof a metal plate 26 which serves as a base block. As shown in FIGS. 1 and 2, a vertically extending tubular metal sleeve 27 of square cross section has its lower end disposed on and sealingly welded to the top surface of the base block 26. A metal top wall 28 extends between and is welded to the upper edges of the sleeve 27, so that the base block 26, sleeve 27 and top wall 28 together define a tank. The top wall 28 has a fill opening therethrough which is normally sealingly closed by a removable fill cap 31. A tubular fitting 32 is welded to the front side of the sleeve 27 adjacent the upper end thereof, and communicates with the interior of the sleeve through a small hole 33 which is provided through the sleeve 27 and which is shown in broken lines in FIG. 1.

The hydraulic cylinder 17 includes a vertically extending cylindrical metal sleeve 36 which serves as the cylinder housing, which has its lower end disposed against and sealingly welded to the upper surface of the base block 26, and which has its upper end projecting through an opening provided in the top wall 28 of the tank. An annular collar 37 extends around and is secured to the upper end of the sleeve 36, and is sealingly welded to the top wall 28. The outer piston rod 18 is vertically slidably received within the sleeve 36 and has extending around and secured to its upper end an annular collar 39, the inner piston rod 19 being vertically slidably received within the outer piston rod 18. Conventional and not-illustrated seals are provided between the inner piston rod 19 and outer piston rod 18 and between the outer piston rod 18 and the sleeve 36. Further, conventional and not-illustrated structure is provided to limit upward movement of the inner piston rod 19 relative to the outer piston rod 18 and to limit upward movement of the outer piston rod 18 relative to the sleeve 36. These features of the hydraulic cylinder 17 are entirely conventional and not a part of the present invention, and are therefore not shown or described.

Referring to FIG. 2, the region within the sleeve 27 of the tank and outside of the sleeve 36 of the hydraulic cylinder 17 serves as reservoir for hydraulic fluid in a manner which will be described in more detail later. The fill opening which is closed by the cap 31 and the hole 33 each communicate with this reservoir.

Figure 3:
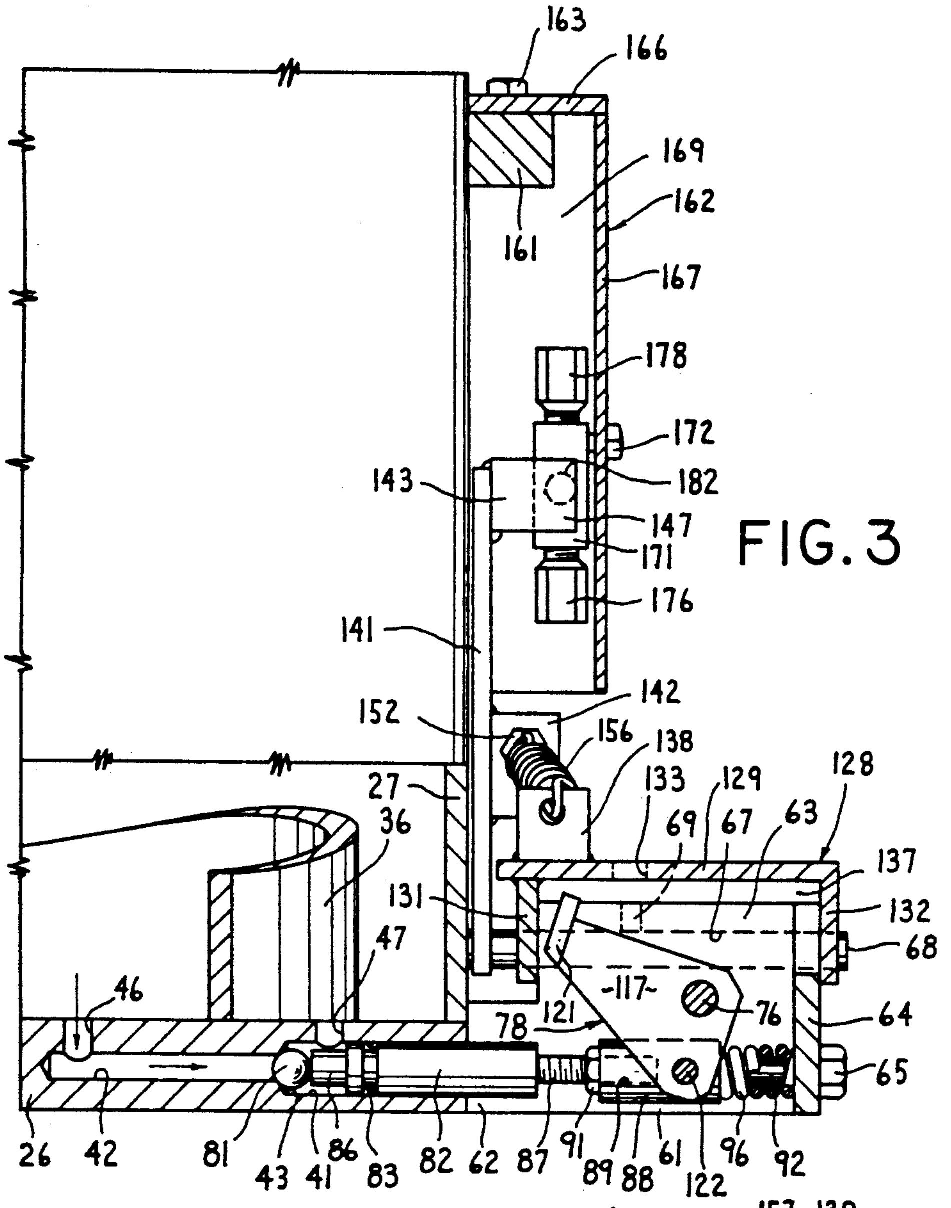
FIG. 3 is a sectional view taken along the line 3—3 in FIG. 2.

Referring to FIGS. 2 and 3, the base block 26 has extending horizontally thereinto from a front side thereof a horizontal bore 41, and from the inner end of the bore 41 a further horizontal bore 42 of smaller diameter extends farther into the base block 26 coaxially with bore 41. Between the bores 41 and 42 is a frustoconical annular step surface 43, which serves as a valve seat in a manner described in more detail later. A vertically extending exhaust hole 46 communicates with the inner end of the bore 42 and opens through the top surface of the base block 26 within the sleeve 36, and a further vertically extending exhaust hole 47 communicates with the bore 41 near the valve seat 43 and opens through the top surface of the base block 26 outside of the sleeve 36 but within the sleeve 27 of the tank. Holes 46 and 47 together with bores 41 and 42 thus define a fluid passageway between the hydraulic cylinder and the reservoir.

Figure 4:
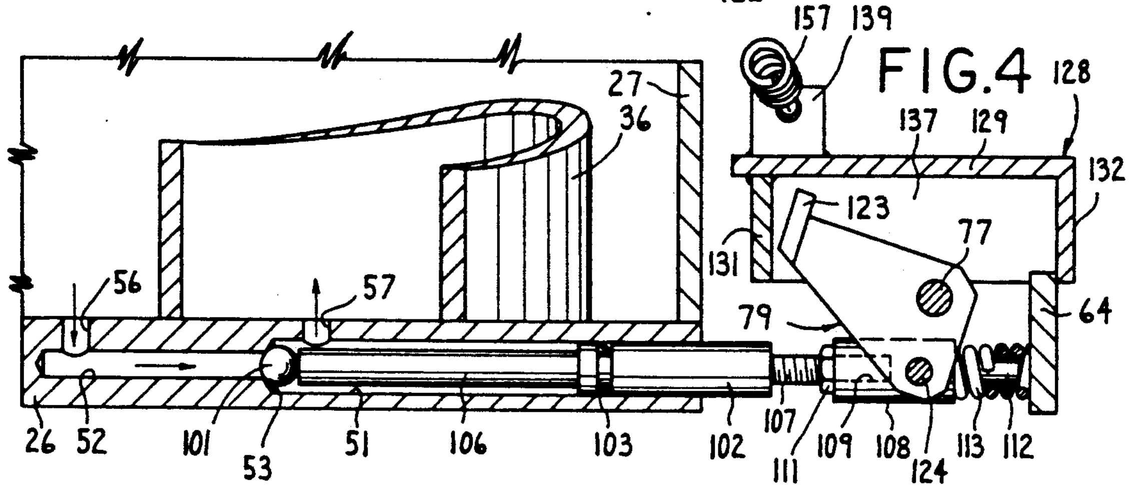
FIG. 4 is a sectional view taken along the line 4—4 in FIG. 2.

Referring to FIGS. 2 and 4, the base block 26 has at a location spaced laterally from the bore 41 a further bore 51 which extends horizontally thereinto, and a further bore 52 of smaller diameter which extends farther into the base block 26 from the inner end of the bore 51 coaxially with bore 51. The bores 51 and 52 have therebetween a frustoconical annular step 53 serving as a valve seat. A vertically extending intake hole 56 communicates with the inner end of the bore 52 and opens through the top surface of the base block 26 externally to the sleeve 36 but within the sleeve 27, and another vertically extending intake hole 57 communicates with the bore 51 adjacent the valve seat 53 and opens through the top surface of the base block 26 within the sleeve 36. Holes 56 and 57 together with bores 51 and 52 thus define a further fluid passageway between the hydraulic cylinder and reservoir.

Figure 5:
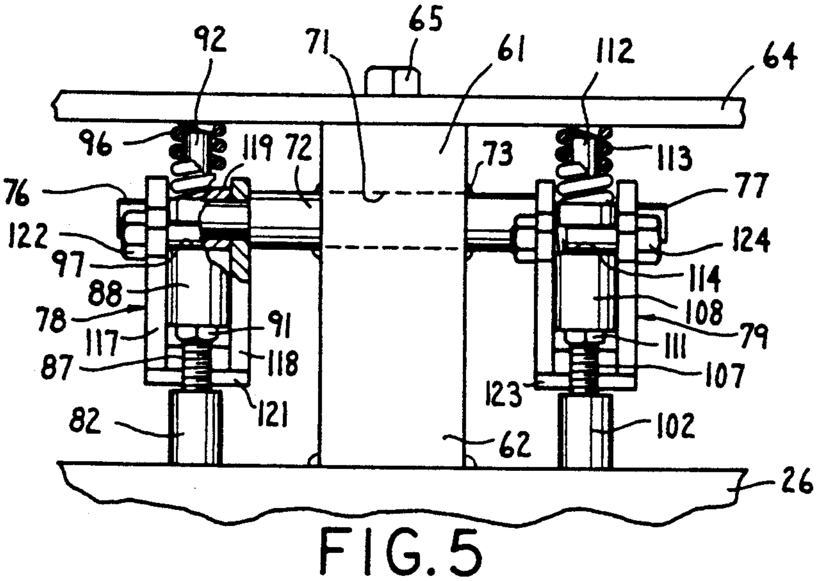
FIG. 5 is a fragmentary bottom view of an actuating mechanism of the jack of FIG. 1.

Referring to FIGS. 3 and 5, an L-shaped support block 61 has a horizontally extending leg 62 with its outer end disposed against and welded to the base block 26 intermediate the bores 41 and 51, and has an upwardly projecting vertical leg 63. A vertical metal spring support plate 64 is disposed against the front end of the support block 61, and is fixedly secured to the support block 61 by a bolt 65 which extends through an opening in the metal plate 64 and threadedly engages a threaded hole provided in the support block 61.

As shown in FIG. 3, a hole 67 extends horizontally through the vertical leg 63 of the support block 61, and a cylindrical pin 68 extends through the hole 67 and the block 61 and through an aligned hole in the plate 64, and is held against axial movement by a threaded stud 69 disposed in a vertical threaded hole in the support block 61 and screwed tight against the cylindrical pin 68. The rear end of pin 68 is disposed against the external surface of sleeve 27, and the front end projects outwardly beyond the plate 64.

The support block 61 also has, as shown in FIGS. 3 and 5, a further horizontal hole 71 therethrough which is located just below and extends perpendicular to the hole 67. A cylindrical pin 72 extends through the hole 71 and projects outwardly on opposite sides of the support block 61, and is secured against axial movement with respect to the support block by welds 73. The pin 72 has portions 76 and 77 at opposite ends thereof which are each spaced outwardly from the support block 61 and which each have a diameter less than that of the central portion of pin 72. The end portions 76 and 77 each pivotally support a respective one of two rocker levers 78 and 79, the structure of which is described in more detail later.

Still referring to FIGS. 3 and 5, a spherical metal valve member 81 with a diameter less than that of the bore 41 and greater than that of the bore 42 is disposed within the bore 41 adjacent the valve seat 43. A cylindrical stem part 82 with a diameter slightly less than that of the bore 41 is axially slidably disposed in the bore 41 and has therein a circumferential groove containing an 0-ring 83 which serves as a seal. The stem part 82 has adjacent the valve member 81 an end portion 86 of reduced diameter in order to facilitate fluid flow between the hole 46 and bore 42 through bore 41, the hole 47 communicating with the bore 41 at a location between the valve seat 43 and the seal 83. The opposite end of the stem part 82 projects outwardly from the base block 26 and has an axially projecting threaded stud 87. A cylindrical adjusting part 88 has therein a threaded opening 89 which threadedly receives the stud 87, and a lock nut 91 provided on the stud 87 can be tightened against the adjusting part 88 in order to prevent rotation of the adjusting part 88 relative to the stud 87. The opposite end of the adjusting part 88 has a cylindrical axial projection 92 with a diameter less than that of the central portion of adjusting part 88, the outer end of the projection 92 being spaced from the plate 64 by a distance of about one-eighth inch in the operational position shown in FIG. 3. The stem part 82 and adjusting part 88 together form a valve stem. A helical compression spring 96 encircles the cylindrical projection 92 and has one end disposed against the plate 64 and its opposite end disposed against an axially facing annular step on the adjusting part 88. The adjusting part 88 has therethrough a transverse hole 97.

FIGS. 4 and 5 show an arrangement similar to that just described, including a spherical valve member 101 disposed in bore 51, a stem part 102 having a groove with an 0-ring 103, having a reduced diameter end portion 106 engageable with the valve member, and having a threaded stud 107 at the opposite end. A cylindrical adjusting part 108 has a threaded opening 109 which cooperates with the stud 107, and a lock nut 111 prevents relative rotation therebetween. The opposite end of the adjusting part 108 has a cylindrical projection 112 of reduced diameter, around which is a helical compression spring 113. A transverse hole 114 is provided through the adjusting part 108. The stem part 102 and adjusting part 108 together form a valve stem.

Figure 6:
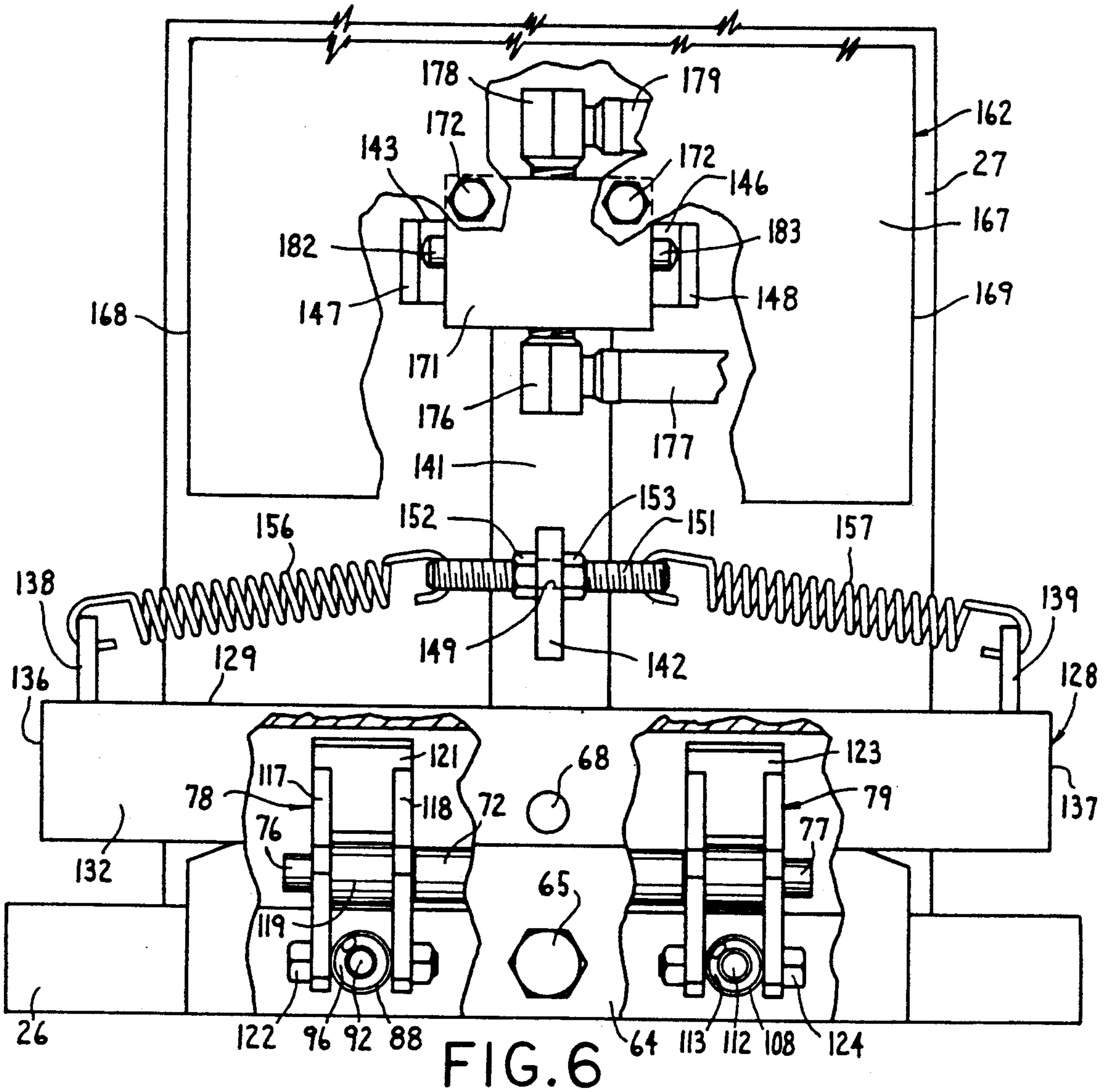
FIG. 6 is a front view of part of the jack of FIG. 1 with portions of an operating lever, a spring support plate and an air valve cover cut away.

Referring to FIGS. 5 and 6, it will be seen that the rocker lever 78 includes two spaced and parallel plates 117 and 118 which are approximately triangular (see FIG. 3), and are each fixedly secured to a cylindrical sleeve 119 which extends between them and is welded to each. The opening through the sleeve 119 has a diameter only slightly larger than the diameter of the end portion 76 of pin 72 and is aligned with openings of equal diameter in each of the plates 117 and 118, the end portion 76 of the pin extending through the sleeve 119 and the openings in plates 117 and 118. An operating plate 121 extends between and is welded to radially outer ends of the plates 117 and 118, the operating plate 121 being spaced above the stem part 82 and adjusting part 88 (FIG. 3). Referring to FIGS. 3 and 5, the plates 117 and 118 are pivotally coupled to the adjusting part 88 by a bolt and nut 122, the bolt extending through the transverse hole 97 in the adjusting part 88 and through aligned holes in the plates 117 and 118. Referring to FIG. 3, the helical spring 96 normally urges the adjusting part 88 and stem part 82 leftwardly so that the spherical valve member 81 is sealingly forced against the valve seat 43, but when a downward force is exerted on the operating plate 121 in a manner described in more detail later, the lever 78 is pivoted counterclockwise in FIG. 3 by the plate 121 and moves the adjusting part 88 and stem part 82 rightwardly against the force of the spring 96, thereby freeing the valve member 81 for movement toward and away from the valve seat based on fluid flow. The spring 96 produces a force which is about 150% of the maximum force which fluid in bore 42 can exert on valve member 81. Counterclockwise pivoting of the lever 78 and the associated rightward movement of the adjusting part 88 is limited by engagement of the outer end of projection 92 with the plate 64.

The lever 79 is effectively identical in structure to the lever 78, and is therefore not separately described in detail, aside from noting that it has an operating plate 123 (FIGS. 4 and 5) and is pivotally coupled to the adjusting part 108 by a bolt and nut 124.

Referring to FIGS. 3 and 6, a foot-actuated operating lever or foot treadle 128 is pivotally supported on the cylindrical pin 68, and in particular includes a horizontal plate 129 and rear and front plates 131 and 132 secured to and projecting downwardly from rear and front edge portions of plate 129. The cylindrical pin 68 extends through aligned holes in the plates 131 and 132, the plates 131 and 132 being located closely adjacent and on opposite sides of the plate 64 and the leg 63 of block 61. The plate 129, when horizontal, is disposed just above the operating plate 121 on rocker lever 78 and the operating plate 123 on rocker lever 79 (See FIG. 6). The horizontal plate 129 has therethrough a small hole 133 which is aligned with the stud 69, so that a conventional hexagonal allen wrench can be inserted through the hole 133 in order to loosen and tighten the stud 69 for purposes of assembling and disassembling the illustrated apparatus. With reference to FIGS. 4 and 6, the operating lever 128 has end plates 136 and 137 welded to opposite ends thereof. As best shown in FIG. 6, spaced spring support plates 138 and 139 are welded to the top side of horizontal plate 129 adjacent opposite ends thereof, and project upwardly from the plate 129. The operating lever 128 is shown in a central or initial position in FIG. 6. If manually pivoted clockwise from this position the plate 129 will engage the plate 123 of lever 79 and thus pivot lever 79 so as to actuate one valve arrangement, whereas if the operating lever 128 is manually pivoted in a counterclockwise direction from the central position of FIG. 6 the top plate 129 will engage the plate 121 of lever 78 and thus pivot lever 78 so as to actuate the other valve arrangement.

Referring to FIGS. 3 and 6, a kicker lever 141 is pivotally supported at its lower end on the rear end of cylindrical pin 68, pin 68 extending through a hole provided at the lower end of lever 141. A vertical centering plate 142 is welded to the vertically extending kicker lever 141 intermediate the upper and lower ends of the kicker lever 141, and extends forwardly from the lever 141. A U-shaped actuating plate 143 is fixedly secured to the upper end of the kicker lever 141, and in particular includes a bight 146 (FIG. 2) which is welded to the upper end of the kicker lever 141, and two legs 147 and 148 which project forwardly from opposite ends of the bight 146.

As shown in FIG. 6, the centering plate 142 has a hole 149 extending therethrough, and a threaded cylindrical centering rod 151 extends slidably through the hole 149. It must be emphasized that the hole 149 is not threaded and does not threadedly engage the threaded centering rod 151. Two nuts 152 and 153 are provided on the centering rod 151 on opposite sides of the centering plate 142, and are normally snugly tightened against the centering plate 142. Two centering springs 156 and 157 which are helical expansion springs each have a first end extending through an opening provided at a respective end of the centering rod 151, and a second end coupled to a respective one of the spring support plates 138 and 139.

The position of nuts 152 and 153 on the centering rod 151 is selected so that the springs 156 and 157 will tend to position the operating lever 128 in the center or initial position of FIG. 6. If the operating lever 128 is not in the horizontal position of FIG. 6 when no force is applied to it, a selected one of the nuts 152 and 153 is loosened one or two turns and then the other thereof is tightened by the same amount, which moves the centering rod 151 lengthwise with respect to the centering plate 142 and thus adjusts the equilibrium position of the operating lever 128. Normally, the position of nuts 152 and 153 is set at the factory, and need not thereafter be modified.

Referring to FIG. 3, a support block 61 is welded to the front side of the sleeve 27 of the tank, and a protective air valve cover 162 is removably supported on the front of the tank by a bolt 163 which extends through a top wall 166 of the cover 162 and enqages a threaded opening in the block 161. In addition to the top wall 166, the cover 162 has a front wall 167 which extends downwardly from the front edge of the top wall 166, and side walls 168 and 169 (FIG. 6) extending downwardly from the sides of the top wall 166.

Referring to FIGS. 3 and 6, an air valve 171 is secured to the inside surface of the front wall 167 by a pair of bolts 172. The air valve 177 is a conventional and commercially available part, and in the preferred embodiment is a model 42PP commercially available from Humphrey Products in Kalamazoo, Michigan. The structure and operation of the valve is thus described only briefly and to the extent necessary to ensure an understanding of the present invention.

In particular, the valve 171 has on the lower side thereof an inlet fitting 176 which is connected to an air supply line 177 (see also FIG. 1). The air supply line 177 is connected in a conventional manner at a not-illustrated remote end to a conventional source of pressurized air. The valve 171 has on the upper side thereof a further fitting 178 which is coupled to a further line 179, and as shown in FIG. 1 the line 179 leads to the fitting 32 and thus communicates through the fitting 32 and opening 33 with the interior of the reservoir region within the tank. As shown in FIG. 6, the valve 171 has extending therethrough a single actuating pin with respective ends 182 and 183 which each project outwardly from an opposite side of the valve.

When the actuating pin is moved rightwardly in FIG. 6, the valve 171 effects communication between the fittings 176 and 178, so that pressurized air from the supply line 177 is supplied through the line 179 to the tank. When the actuating member is moved leftwardly in FIG. 6, the valve 171 effects communication between the fitting 178 and the surrounding atmosphere through a port in the bottom of valve 171, so that pressurized air from the tank flows back through the line 179 and is exhausted to the atmosphere through the valve 171. As shown in FIGS. 2 and 6, the air valve 171 is disposed between the legs 147 and 148 of the actuating plate 143 provided at the upper end of the kicker lever 141, the ends 182 and 183 of the actuating pin each being immediately adjacent the inner surface of a respective one of the legs 147 and 148.

Figure 7:
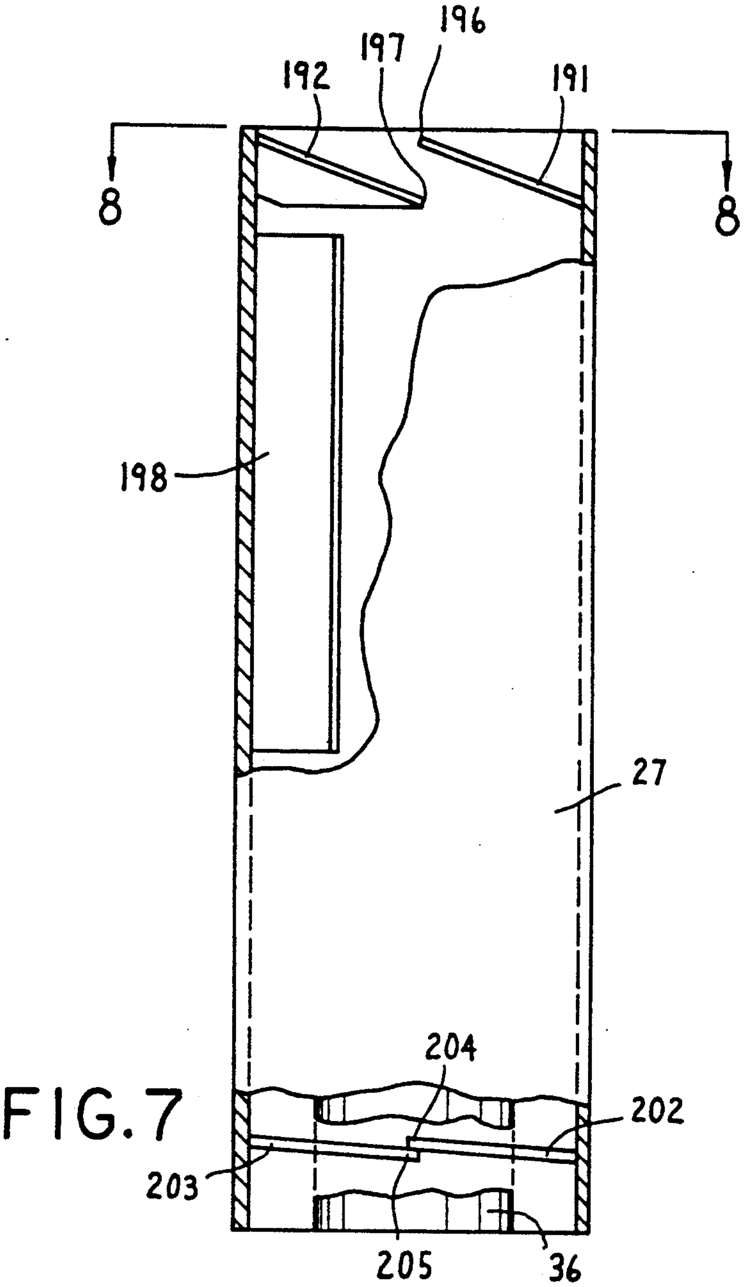
FIG. 7 is a fragmentary front view of a reservoir and hydraulic cylinder of the jack of FIG. 1, showing baffle plates which are present in the interior of the reservoir.
Figure 8:
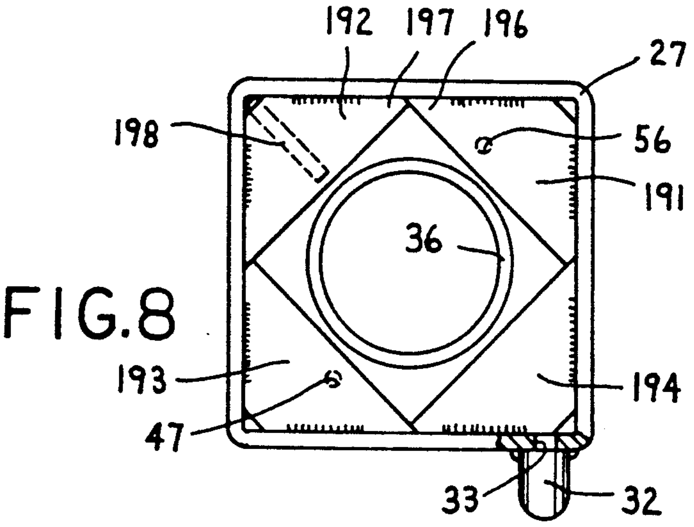
FIG. 8 is a view taken along the line 8—8 in FIG. 7.

Referring to FIGS. 7 and 8, the tank defined by sleeve 27 has therein an anti-cyclone arrangement which includes four baffle plates 191–194 near the upper end of sleeve 27. Each of the plates 191–194 is approximately triangular in shape, and is welded in a respective corner of the sleeve 27 adjacent the upper end of sleeve 27, the innermost edge of each baffle plate being closely adjacent the cylindrical sleeve 36 which serves as the housing of the hydraulic cylinder. The baffle plates 191–194 are each inclined so that one end of each is spaced above the end of an adjacent baffle plate. For example, as shown in FIG. 7, the end 196 of plate 191 is spaced above the end 197 of plate 192. In the preferred embodiment, the spacing between ends 196 and 197 is approximately 1.25 inches.

The anti-cyclone arrangement also includes an elongate, vertically extending corner baffle plate 198 which has its upper end disposed a small distance below the baffle plate 192 and which has one of its longer edges disposed in and welded to a corner of sleeve 27, the plate 198 projecting inwardly from the corner at an angle of approximately 45° to each of the adjacent walls of sleeve 27. The innermost edge of the plate 198 is close to the outer surface of cylindrical sleeve 36.

Near the lower end of the sleeve 27 is an anti-turbulence arrangement which includes four additional baffle plates, two of which are visible at 202 and 203. The lower baffle plates are substantially identical in shape and arrangement to the upper baffle plates 191–194, except that they have only a minimal incline so that each has an end which rests on top of the end of an adjacent plate. For example, as shown in FIG. 7, the end 204 of plate 202 engages the top of end 205 of plate 203.

OPERATION

Assume that the piston rods 18 and 19 of the hydraulic cylinder 17 are each initially in their lower-most positions. In this condition, the fluid in the reservoir region (within the sleeve 27 and external to the sleeve 36 of the hydraulic cylinder) will normally have a vertical level which is approximately two-thirds of the height of the sleeve 27. It is also assumed that the supply line 177 is coupled to an active pressurized air source.

Referring to FIG. 6, assume that an operator now places his foot on the righthand portion of operating lever 128 and begins to press down, so that the lever 128 begins to pivot clockwise. Spring support plates 138 and 139 thus move, and as the springs 156 and 157 attempt to maintain equilibrium they pivot the kicker plate 141 clockwise a small amount. This causes the actuating plate 143 at the upper end of the kicker lever to push on the end 182 of the actuating pin of the valve 171 and force it rightwardly in FIG. 6, which causes the valve to effect communication between fittings 176 and 178, so that pressurized air is supplied through line 179, fitting 32 and hole 33 to the reservoir in the tank. Referring to FIG. 8, it will be noted that this would normally have a tendency to create a counterclockwise swirling effect or cyclone effect within the tank. However, the incoming air flow enters the tank above the baffle plate 194, and the presence and inclination of the baffle plates 191–194 in combination with the presence and orientation of corner baffle plate 198 disperses the incoming air flow so as to avoid a cyclone effect, which would tend to create turbulence on the upper surface of the hydraulic fluid within the reservoir, to avoid the misting of hydraulic fluid within the air which would result from surface turbulence and swirling air. The air pressure thus created in the upper portion of the reservoir urges the hydraulic fluid therein downwardly so that it becomes pressurized and attempts to flow out through the hole 56 (FIG. 4).

As the operator continues to press the righthand portion of operating lever 128 downwardly in FIG. 6, the kicker lever 141 will not pivot any farther and thus the spring 157 expand and the spring 156 will contract, and the horizontal plate 129 of lever 128 will engage the operating plate 123 of rocker lever 79 and will pivot lever 79. Referring to FIG. 4, this counterclockwise pivoting of lever 79 will shift the valve stem which includes parts 102 and 108 rightwardly against the urging of spring 113. Due to the air pressure in the reservoir, the fluid in the reservoir will be at a higher pressure than the fluid in the hydraulic cylinder. Thus, hydraulic fluid within the reservoir which is trying to flow through hole 56 and bore 52 will push the valve member 101 away from the valve seat and will flow through bore 51 and hole 57 into the sleeve 36 of the hydraulic cylinder, and as the hydraulic cylinder progressively fills with fluid the piston rods 18 and 19 will be moved progressively upwardly. If the operator removes his foot from the plate, the spring 113 will return the valve stem 102 and 108 to the position of FIG. 4, in which the valve member 101 is pressed against the valve seat to obstruct fluid flow, and thus the piston rods of the hydraulic cylinder will stop in their current positions. The leftward movement of adjusting part 108 by spring 113, in combination with springs 156 and 157 returning to equilibrium positions, will pivot the operating lever 128 back toward its center position.

If the operator wishes to lower the pistons of the hydraulic cylinder, he uses his foot to press down on the lefthand portion of the operating lever 128 in FIG. 6, so that the operating lever 128 pivots counterclockwise. This pivots the kicker lever 141 counterclockwise so that the end 183 of the actuating pin of the air valve 171 is pressed leftwardly, which places the valve 171 in a condition in which it connects the fitting 178 to the atmosphere, thereby permitting the air pressure within the reservoir region of the tank to flow back through the line 179 and the valve 171 and to be exhausted into the atmosphere, so that the interior of the tank is at atmospheric pressure. Further counterclockwise pivoting of the operating lever 128 also pivots the rocker lever 78 in a counterclockwise direction as viewed in FIG. 3, so that the valve stem which includes parts 82 and 88 is moved rightwardly against the urging of spring 96. The weight of the piston rods and any load thereon will be creating a pressure within the hydraulic cylinder which is greater than the pressure in the reservoir, and which thus will cause fluid to flow through hole 46 and bore 42 and push the valve member 81 away from the valve seat, the fluid then continuing through bore 41 and hole 47 into the reservoir.

Referring to FIG. 8, it will be noted that the hole 47 is directly below one of the lower baffle plates of the anti-turbulence arrangement, and thus the hydraulic fluid rushing into the reservoir will not shoot upwardly the full height of the reservoir in a manner producing a fountain-like effect, which would have the disadvantage of creating turbulence on the surface of the hydraulic fluid which in turn can cause misting of the hydraulic fluid so that air exiting the reservoir through the opening 33 carries hydraulic fluid into the air valve 171, where it could interfere with proper operation of the air valve 171. Instead, the stream of fluid entering the reservoir through the hole 47 is deflected by the lower baffle plates in a manner maintaining turbulence at the lowermost portion of the reservoir.

So long as the operator continues pressing down on the operating lever 128, the piston rods will continue to move downwardly and fluid will continue to flow from the hydraulic cylinder into the reservoir. When the operator removes his foot from the operating lever, the spring 96 will force the valve stem 82 and 88 leftwardly so that the valve member 81 is forced against the valve seat and interrupts the fluid flow, and thus the piston rods will halt in their current position. The leftward movement of adjusting part 88 by the spring 96 will pivot the lever 78 clockwise, and thus the lever 78 in combination with springs 156 and 157 will pivot the operating lever 128 back to the center position shown in FIG. 6.

It is important to note that the valve members 81 and 101 (FIGS. 3 and 4) are each physically separate from their corresponding stem parts 82 and 102, and are therefore free to operate as check valves. Thus, for example, if the operator has pressed the operating lever 128 in a manner pivoting the lever 79 (FIG. 4) to release the valve member 101 so that fluid can flow from the reservoir into the hydraulic cylinder in order to raise the piston rods, and if at some point during this operation the pressurized air source fails or is inadvertently disconnected from the jack 10, even a small amount of fluid flow in a reverse direction from the hydraulic cylinder through hole 57, bores 51 and 52 and hole 56 to the reservoir will immediately force the valve member 101 against the valve seat so that it sealingly obstructs further reverse fluid flow. This in turn prevents the piston rods of the hydraulic cylinder from dropping more than a negligible amount as a result of a loss of pressurized air while the pistons are being raised. In this situation, it is irrelevant that the operator may maintain his foot on the operating lever 129 so that the lever 79 is kept pivoted and the stem part 102 is held in a spaced relationship to the valve member 101, because the fluid pressure attempting to flow from hole 57 into the bore 52 will maintain the valve member 101 sealingly against the valve seat. In view of the fact that the hydraulic jack 10 is used to move very heavy items such as vehicle engines and transmissions, this is an important safety feature which eliminates a possible source of serious injury to the operator or another person as a result of unexpected and unintended downward movement of the jack.

Although the specific situation of a loss of pressurized air has been used as an exemplary situation, it will be noted that through the use of separate valve members 81 and 101 which are each capable of operating as a check valve, in combination with a single operating lever 128 and a mechanism which can release only one of the valve members at any given point in time, fluid can flow only in an intended direction with respect to either valve member and never in a reverse direction with respect to that valve member. Stated differently, the valve member 101 always permits fluid flow only from the reservoir into the hydraulic cylinder, and the valve member 81 only permits fluid flow from the hydraulic cylinder into the reservoir. The use of the single operating lever 128 means that only one of the valve members 81 and 101 can permit fluid flow at any given point in time.

If necessary, the lock nut 91 (FIG. 3) can be loosened, the stem part 82 can be rotated to move the adjusting part 88 with respect to the stem part 82, which also adjusts the pivotal orientation of the lever 78, and then the lock nut 91 can be tightened again. However, an appropriate setting is made at the factory when the unit is manufactured, and during normal operation should not need to be adjusted during the lifetime of the hydraulic jack. The same is true of lock nut 111.

Although one preferred embodiment has been shown and described in detail for illustrative purposes, it will be recognized that there are variations and modifications of the disclosed apparatus, including the rearrangement of parts, which lie within the scope of the present invention.

The embodiments of the invention in which an exclusive property or privilege is claimed are defined as follows:

1. A hydraulic jack, comprising: a hydraulic cylinder having a piston rod reciprocable between extended and retracted positions; a load supporting member movable between two positions in response to movement of said piston rod between said extended and retracted positions; means defining a reservoir partially filled with a hydraulic fluid; means for pressurizing air disposed in said reservoir above said hydraulic fluid; a manually operable control member supported for movement between first and second positions through a third position; hydraulic valve means communicating with said reservoir and with said hydraulic cylinder, said hydraulic valve means being responsive to movement of said control member from said third position toward said first position for preventing fluid flow from said hydraulic cylinder to said reservoir and for permitting fluid flow from said reservoir to said hydraulic cylinder at a rate which increases progressively as said control member is moved progressively closer to said first position, and being responsive to movement of said control member from said third position toward said second position for permitting fluid flow out of said hydraulic cylinder at a rate which increases progressively as said control member is moved progressively closer to said second position.

2. A hydraulic jack of claim 1, wherein said means for pressurizing air includes selectively actuable means responsive to movement of said control member toward said first position for pressurizing the air in said reservoir and responsive to movement of said control member toward said second position for venting air from said reservoir.

3. A hydraulic jack of claim 1, wherein said hydraulic valve means, in said second operational mode thereof, causes fluid flowing out of said hydraulic cylinder to flow into said reservoir, and prevents fluid flow from said reservoir to said hydraulic cylinder.

4. A hydraulic jack of claim 3, wherein said hydraulic valve means includes means defining a first passageway which communicates at its respective ends with said hydraulic cylinder and said reservoir and which has between its ends a first valve seat; means defining a second passageway which communicates at its respective ends with said hydraulic cylinder and said reservoir and which has between its ends a second valve seat; a first valve member movable between positions respectively engaging and spaced from said first valve seat in which it is respectively obstructing and permitting fluid flow through said first passageway, fluid flow through said first passageway respectively to and from said hydraulic cylinder respectively urging said first valve member away from and toward said first valve seat; a second valve member movable between two positions in which it is respectively engaging and spaced from said second valve seat and in which it is respectively obstructing and permitting fluid flow through said second passageway, fluid flow through said second passageway respectively to and from said hydraulic cylinder respectively urging said second valve member toward and away from said second valve seat; means responsive to movement of said control member from said third position toward said first position for permitting said first valve member to freely move in response to fluid flow through a progressively increasing range of movement to and from said position engaging said first valve seat and responsive to said control member being on a side of said third position remote from said first position for forcing said first valve member into engagement with said first valve seat; and means responsive to movement of said control member from said third position toward said second position for permitting said second valve member to freely move in response to fluid flow through a progressively increasing range of movement to and from said position engaging said second valve seat and responsive to said control member being on a side of said third position remote from said second position for forcing said second valve member into engagement with said second valve seat.

5. A jack of claim 4, wherein said hydraulic valve means includes a first valve stem which has a first end engageable with said first valve member and which is movable between a first position in which said first valve stem forcibly maintains said first valve member against said first valve seat and a second position in which said first valve member is free to move between said positions engaging and spaced from said first valve seat in response to fluid flow; a second valve stem which has a first end engageable with said second valve member and which is movable between a first position in which said second valve stem forcibly maintains said second valve member in engagement with said second valve seat and a second position in which said second valve member is free to move between said positions engaging and spaced from said second valve seat in response to fluid flow; first resilient means yieldably urging said first valve stem toward said first position thereof; second resilient means yieldably urging said second valve stem toward said first position thereof, means responsive to movement of said control member from said third position toward said first position thereof for moving said first valve stem from its first position toward its second position against the urging of said first resilient means; and means responsive to movement of said control member from said third position toward said second position thereof for moving said second valve stem from its first position toward its second position against the urging of said second resilient means.

6. A jack of claim 5, wherein said means for moving said first valve stem includes a first pivotally supported lever which is cooperable with said first valve stem, wherein as said control member moves from its third position toward its first position it engages and pivots said first lever in a manner causing said first lever to move said first valve stem from its first position to its second position against the urging of said first resilient means, wherein said means for moving said second valve stem includes a second pivotally supported lever cooperable with said second valve stem, and wherein as said control member moves from its third position toward its second position said control member engages and pivots said second lever in a manner causing said second lever to move said second valve stem from its first position to its second position against the urging of said second resilient means.

7. A jack of claim 6, wherein said valve stems each include a first stem part having thereon a threaded stud extending substantially parallel to the direction of movement of the valve stem and a second stem part having a threaded opening which receives said threaded stud so that relative rotation of the stem parts effects adjustment of the effective length of the valve stem, and includes a lock nut provided on the threaded stud and engageable with the second stem part to releasably lock the second stem part against rotation relative to the first stem part, one of the first and second stem parts being pivotally coupled to a respective one of said first and second levers and the other of said stem parts being engageable with a respective one of said first and second valve members.

8. An apparatus of claim 7, wherein said first resilient means includes a helical compression spring supported on said jack and having an end engageable with an end of said first valve stem remote from said first valve member, and wherein said second resilient means includes a helical compression spring supported on said jack and having an end engageable with an end of said second valve stem remote from said second valve member.

9. A jack of claim 6, wherein said jack includes a base member having spaced first and second bores therein, said first and second bores each having axially spaced portions of different diameter with an annular step surface therebetween which serves as a respective one of said first and second valve seats, said first and second valve members each being spherical and disposed in the larger diameter portion of a respective one of said bores adjacent a respective one of said valve seats, said first and second valve stems each having a portion disposed in the larger diameter portion of a respective one of said first and second bores and having therearound an annular seal which slidably engages an inner surface of the larger diameter portion of the bore, said first passageway including portions of said first bore disposed adjacent and on opposite sides of said first valve seat, and said second passageway including portions of said second bore disposed adjacent and on opposite sides of said second valve seat.

10. A jack of claim 9, including a support block fixedly secured to said base member intermediate said first and second bores, means pivotally supporting each of said first and second levers on opposite sides of said support block for pivotal movement about a common pivot axis which extends perpendicular to directions of movement of each of said first and second valve stems, and means pivotally supporting said control member on said support block above said levers for movement about a pivot axis which is disposed between said levers and extends approximately perpendicular to the pivot axis of said levers and approximately parallel to the directions of movement of said valve stems, said control member extending approximately horizontally and having portions on each side of said pivot axis thereof which are each disposed above and engageable with a respective one of said levers.

11. A jack of claim 10, wherein said base member has thereon an upper surface with a first surface portion which serves as a lower end of said reservoir and a second surface portion which serves as a lower end of said hydraulic cylinder, said first passageway including a hole extending vertically through said base member from said first surface portion to the smaller diameter portion of said first bore and a second hole which extends vertically through said base member from said second surface portion to the larger diameter portion of said first bore at a location between said first valve seat and said annular seal on said first valve stem; and wherein said second passageway includes a third hole extending vertically through said base member from said second surface portion to said smaller diameter portion of said second bore, and includes a fourth hole extending vertically through said base member from said first surface portion to said larger diameter portion of said second bore at a location between said second valve seat and said annular seal on said second valve stem.

12. A jack of claim 11, including a turbulence reducing means provided within said reservoir a small distance above said fourth hole in said base member for preventing fluid entering said reservoir through said fourth hole from producing turbulence at an upper surface of the hydraulic fluid within said reservoir.

13. A hydraulic jack, comprising: a hydraulic cylinder having a piston rod reciprocable between extended and retracted positions; a load supporting member movable between two positions in response to movement of said piston rod between said extended and retracted positions; means defining a reservoir partially filled with a hydraulic fluid; means for pressurizing air disposed in said reservoir above said hydraulic fluid; hydraulic valve means communicating with said reservoir and with said hydraulic cylinder, said hydraulic valve means having a first operational mode in which said hydraulic valve means permits fluid flow from said reservoir to said hydraulic cylinder and prevents fluid flow from said hydraulic cylinder to said reservoir, and having a second operational mode in which said hydraulic valve means permits fluid flow out of said hydraulic cylinder, a manually operable first actuating part movable to and from an actuated position, said hydraulic valve means being responsive to movement of said first actuating part toward said actuated position thereof for operating in said first operational mode; a manually operable second actuating part movable to and from an actuated position, said hydraulic valve means being responsive to movement of said second actuating part toward said actuated position thereof for operating in said second operational mode; and means for preventing said first and second actuating parts from simultaneously being in said actuated positions thereof.

14. A hydraulic jack of claim 13, wherein said means for preventing said first and second actuating parts from simultaneously being in said actuated positions thereof includes a manually operable control member movable to first and second positions, said first and second actuating parts being respective parts of said control member, said first actuating part being in said actuated position thereof when said control member is in said first position and said second actuating part being in said actuated position thereof when said control member is in said second position.

15. A hydraulic jack of claim 13, wherein said means for pressurizing includes air pressure control means having first and second operational modes in which said air pressure control means causes the air in said reservoir to respectively have first and second pressures, said first pressure being greater than said second pressure, and wherein said air pressure control means is responsive to movement of said first actuating part toward said actuated position thereof for operating in said first operational mode and is responsive to movement of said second actuating part toward said actuated position thereof for operating in said second operational mode.

16. A hydraulic jack of claim 15, wherein said air pressure control means includes a pressurized air source and air valve means for respectively supplying air from said source to said reservoir is responsive to movement of said first actuating part toward said actuated position thereof and for venting air from said reservoir in response to movement of said second actuating part toward said actuated position thereof.

17. A hydraulic jack, comprising: a hydraulic cylinder having a piston rod movable between extended and retracted positions, a load supporting member moved between two positions in response to movement of said piston rod between said extended and retracted positions, means defining a reservoir partially filled with a hydraulic fluid, manually actuable means for generating manually actuated first and second conditions, hydraulic valve means responsive to said first condition for permitting fluid flow from said reservoir to said hydraulic cylinder and responsive to said second condition for permitting fluid flow from said hydraulic cylinder to said reservoir, and air valve means responsive to said first condition for supplying pressurized air to said reservoir and responsive to said second condition for venting pressurized air from said reservoir; wherein said manually actuable means includes a manually actuable actuating member movable between first and second positions, movement of said actuating member to said first position being said first condition and movement of said actuating member to said second position being said second condition; wherein as said actuating member moves between said first and second positions said actuating member moves through a third position therebetween; wherein said hydraulic valve means is responsive to said actuating member being in said third position for preventing fluid flow to or from said hydraulic cylinder; and wherein said air valve means includes an air valve supported on said jack and having an operating part movable between first and second positions, wherein when said operating part is in said first position said air valve effects communication between a source of pressurized air and said reservoir and when said operating part is in said second position said air valve vents pressurized air from said reservoir, includes a kicker member supported on said jack for movement between said first and second positions, said kicker member being engageable with said operating part of said air valve for effecting movement of said operating part to said first and second positions thereof in response to movement of said kicker member respectively to its first and second positions, and includes means responsive to movement of said actuating member respectively to its first and second positions for effecting movement of said kicker member respectively to its first and second positions.

18. A jack of claim 17, wherein said actuating member and said kicker member are supported for pivotal movement about respective pivot axes which are approximately coaxial, and including first and second expansion springs which have first ends respectively coupled to said actuating member at spaced locations thereon and which extend toward each other from said spaced locations and have adjacent second ends which are each coupled to said kicker member, said springs being responsive to movement of said actuating member respectively to said first and second positions thereof for urging movement of said kicker member respectively to said first and second positions thereof.

19. A jack of claim 18, wherein said kicker member includes a platelike portion having therethrough an opening which is spaced from and extends approximately tangentially with respect to said pivot axis, and includes a rod extending through said opening and means for selectively adjusting the axial position of said rod within said opening, said second ends of said springs each being coupled to a respective end of said rod.

20. A jack of claim 19, wherein said means for adjusting the axial position of said rod includes said rod being threaded and being freely axially movable within said opening, and includes two nuts which threadedly engage said rod and are disposed on opposite sides of said platelike portion in engagement therewith.

21. A jack of claim 20, wherein said operating part of said air valve is an elongate part which moves in a lengthwise direction between said first and second positions thereof, and wherein a portion of said kicker member engageable with said operating part of said air valve is a U-shaped portion having spaced legs, said operating part of said air valve being disposed between said legs of said U-shaped portion with its opposite ends each closely adjacent a respective one of said legs of said U-shaped portion.

22. A hydraulic jack, comprising: a hydraulic cylinder having a piston rod movable between extended and retracted positions, a load supporting member moved between two positions in response to movement of said piston rod between said extended and retracted positions, means defining a reservoir partially filled with a hydraulic fluid, manually actuable means for generating manually actuated first and second conditions, hydraulic valve means responsive to said first condition for permitting fluid flow from said reservoir to said hydraulic cylinder and responsive to said second condition for permitting fluid flow from said hydraulic cylinder to said reservoir, and air valve means responsive to said first condition for supplying pressurized air to said reservoir and responsive to said second condition for venting pressurized air from said reservoir, wherein said reservoir has an opening in an upper portion thereof through which said air valve means effects said supply of pressurized air to said reservoir, and including baffle means within said upper portion of said reservoir for preventing air entering said reservoir through said opening from producing a cyclone effect within said reservoir.

23. A jack of claim 22, wherein said baffle means includes a plurality of inclined plates disposed at uniform intervals around said upper portion of said reservoir, each said plate having one end spaced below an end of another said plate on one side thereof and another end spaced above an end of a further said plate on the other side thereof, and including a vertically extending plate secured to and projecting inwardly from a wall of said reservoir at a location below said inclined plates.

24. A hydraulic jack, comprising: a hydraulic cylinder having a piston rod reciprocable between extended and retracted positions; a load supporting member movable between two positions in response to movement of said piston rod between said extended and retracted positions; means defining a reservoir partially filled with a hydraulic fluid and having air above said hydraulic fluid; air pressure control means communicating with the air disposed in said reservoir above said hydraulic fluid, said air pressure control means having first and second operational modes in which said air pressure control means causes the air in said reservoir to respectively have first and second pressures, said first pressure being greater than said second pressure; hydraulic valve means communicating with said reservoir and with said hydraulic cylinder, said hydraulic valve means having a first operational mode in which said hydraulic valve means permits fluid flow from said reservoir to said hydraulic cylinder and prevents fluid flow from said hydraulic cylinder to said reservoir, and having a second operational mode in which said hydraulic valve means permits fluid flow from said hydraulic cylinder to said reservoir; and a manually operable control member supported for movement between first and second positions through a third position, said air pressure control means being responsive to movement of said control member from said third position respectively toward said first and second positions for respectively operating in said first and second operational modes, and said hydraulic valve means being responsive to movement of said control member from said third position respectively toward said first and second positions for respectively operating in said first and second operational modes thereof.

25. A hydraulic jack of claim 24, wherein said hydraulic valve means prevents fluid flow from said reservoir to said hydraulic cylinder in said second operational mode thereof.

26. A hydraulic jack of claim 24,, wherein said hydraulic valve means, in said first operational mode thereof, progressively increases the rate at which hydraulic fluid is permitted to flow from said reservoir to said hydraulic cylinder as said control member is moved progressively closer to said first position.

27. A hydraulic jack of claim 26, wherein said hydraulic valve means, in said second operational mode thereof, progressively increases the rate at which hydraulic fluid is permitted to flow from said hydraulic cylinder to said reservoir as said control member is moved progressively closer to said second position.

28. A hydraulic jack of claim 27, wherein said hydraulic valve means is responsive to said control member being in said third position for operating in a third operational mode in which said hydraulic valve means prevents fluid flow from either of said reservoir and said hydraulic cylinder to the other thereof.

29. A hydraulic jack of claim 28, wherein said control member is a pivotally supported foot pedal.

* * * * *